United States Patent
Han et al.

(10) Patent No.: US 8,611,026 B2
(45) Date of Patent: Dec. 17, 2013

(54) OPTICAL DEVICE INCLUDING AT LEAST ONE REPLICATED SURFACE AND ASSOCIATED METHODS

(75) Inventors: Hongtao Han, Charlotte, NC (US); Alan Kathman, Charlotte, NC (US); Rong Huang, Charlotte, NC (US); Michael Feldman, Huntersville, NC (US); Robert D. TeKolste, Charlotte, NC (US); Jeremy Huddleston, Charlotte, NC (US); James Carriere, Charlotte, NC (US); Michael Magoon, Charlotte, NC (US); Jack Schmidt, San Marcos, CA (US)

(73) Assignee: Digitaloptics Corporation, San Jose, CA (US)

( * ) Notice: Subject to any disclaimer, the term of this patent is extended or adjusted under 35 U.S.C. 154(b) by 644 days.

(21) Appl. No.: 12/382,944

(22) Filed: Mar. 26, 2009

(65) Prior Publication Data

US 2009/0290833 A1    Nov. 26, 2009

Related U.S. Application Data

(60) Provisional application No. 61/040,002, filed on Mar. 27, 2008.

(51) Int. Cl.
*G02B 9/00* (2006.01)
*G02B 27/10* (2006.01)

(52) U.S. Cl.
USPC ............ 359/796; 359/619; 359/621; 359/797

(58) Field of Classification Search
USPC .................... 359/796, 797, 619–621
See application file for complete search history.

(56) References Cited

U.S. PATENT DOCUMENTS

| | | | |
|---|---|---|---|
| 5,178,800 A | 1/1993 | Blum | |
| 6,084,724 A * | 7/2000 | Wiegand et al. | 359/796 |
| 6,373,634 B1 | 4/2002 | Nishikawa | |
| 6,473,238 B1 | 10/2002 | Daniell | |
| 7,245,834 B2 | 7/2007 | Vigier-Blanc et al. | |
| 7,920,342 B2 | 4/2011 | Duparre et al. | |
| 2003/0021034 A1 * | 1/2003 | Yoshikawa et al. | 359/619 |
| 2004/0047274 A1 | 3/2004 | Amanai | |
| 2005/0074702 A1 | 4/2005 | Lee et al. | |
| 2005/0088751 A1 * | 4/2005 | Shimizu et al. | 359/619 |
| 2005/0104238 A1 | 5/2005 | Sander et al. | |
| 2005/0133688 A1 | 6/2005 | Li et al. | |
| 2006/0273478 A1 | 12/2006 | Jin et al. | |

FOREIGN PATENT DOCUMENTS

| WO | WO 03/069741 A2 | 8/2003 |
|---|---|---|
| WO | WO 2008/020899 A2 | 2/2008 |

* cited by examiner

*Primary Examiner* — Evelyn A. Lester
(74) *Attorney, Agent, or Firm* — Lee & Morse, P.C.

(57) ABSTRACT

An optical device includes a substrate. a non-planar transparent structure on a first surface of the substrate, the non-planar transparent structure being made of a first material, and a molded refractive surface on the first surface of the substrate adjacent the non-planar transparent structure, the molded refractive surface being made of a second material, different from the first material.

10 Claims, 17 Drawing Sheets

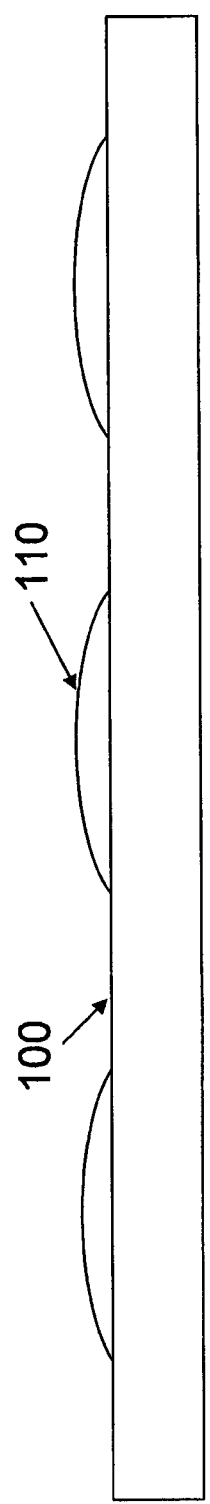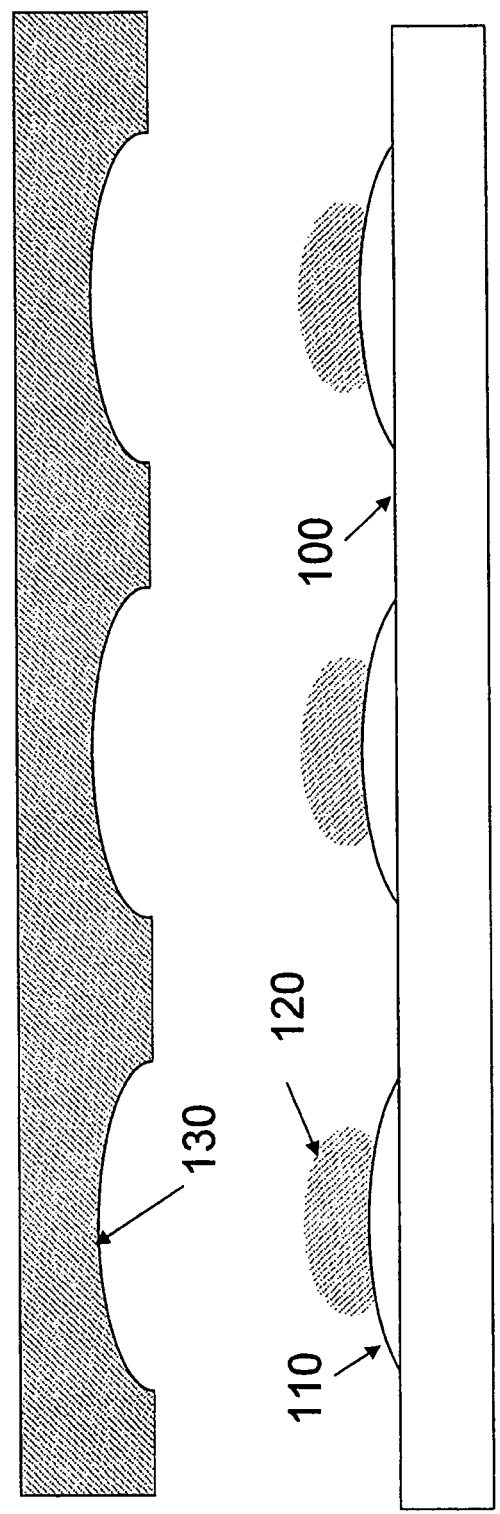

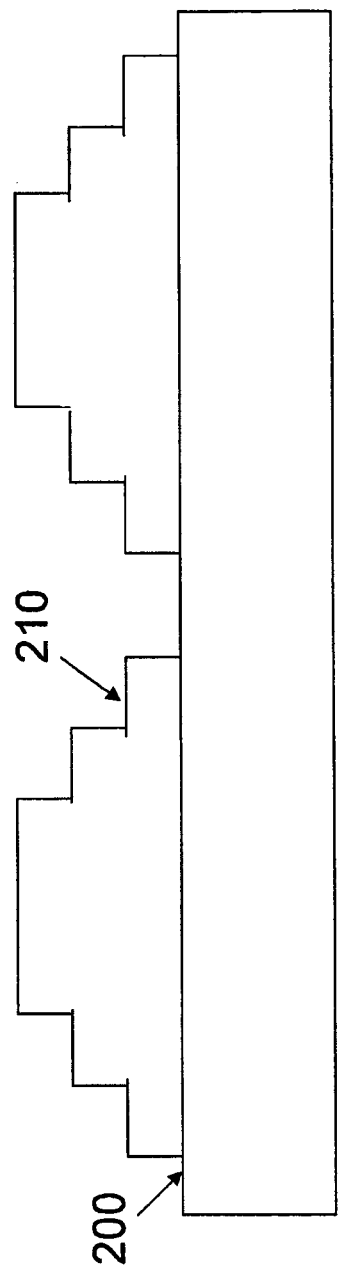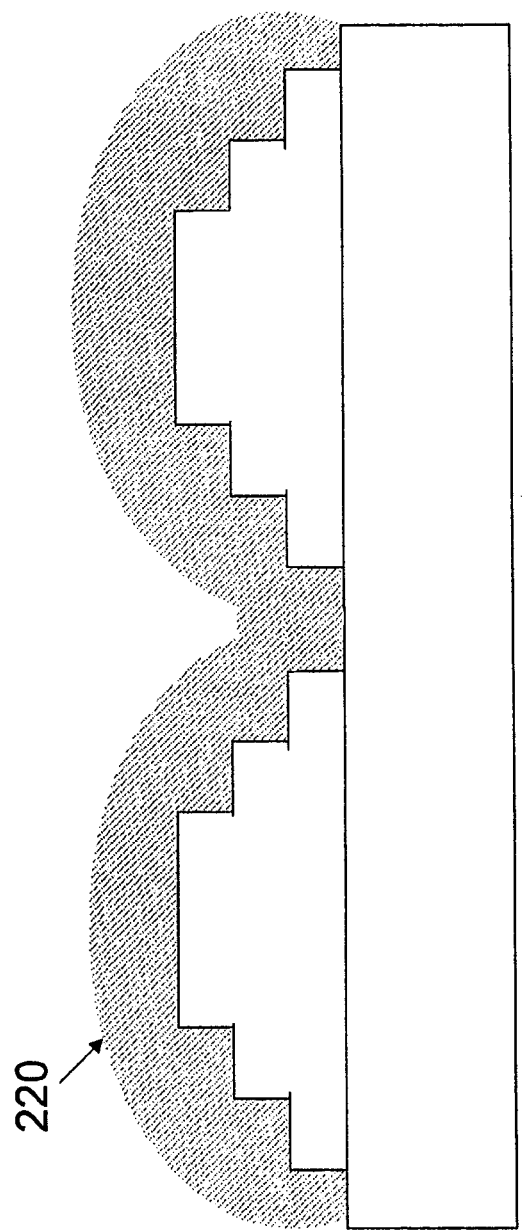
FIG. 5
FIG. 6

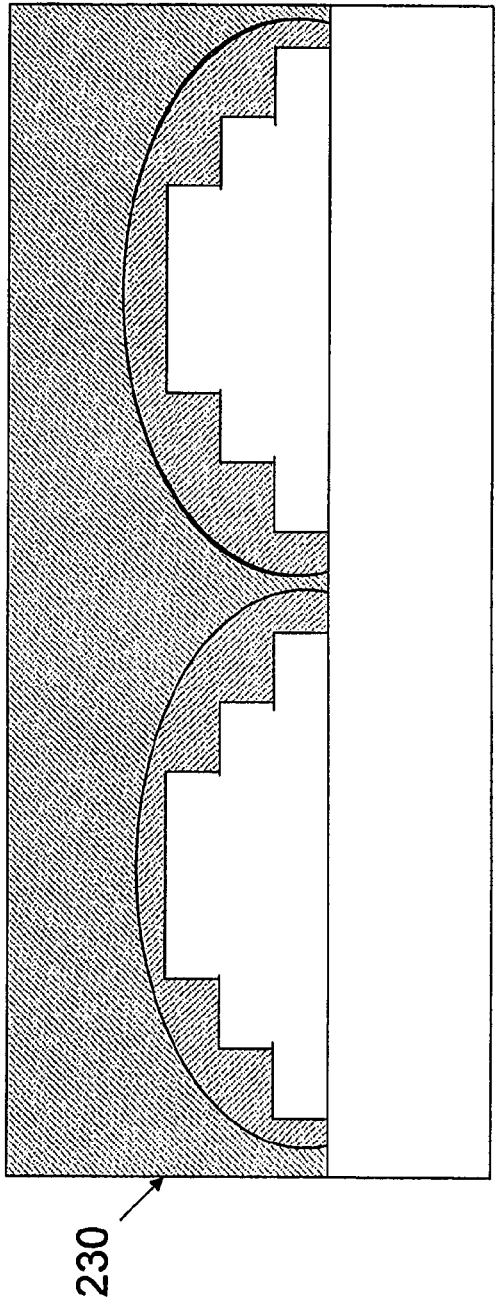
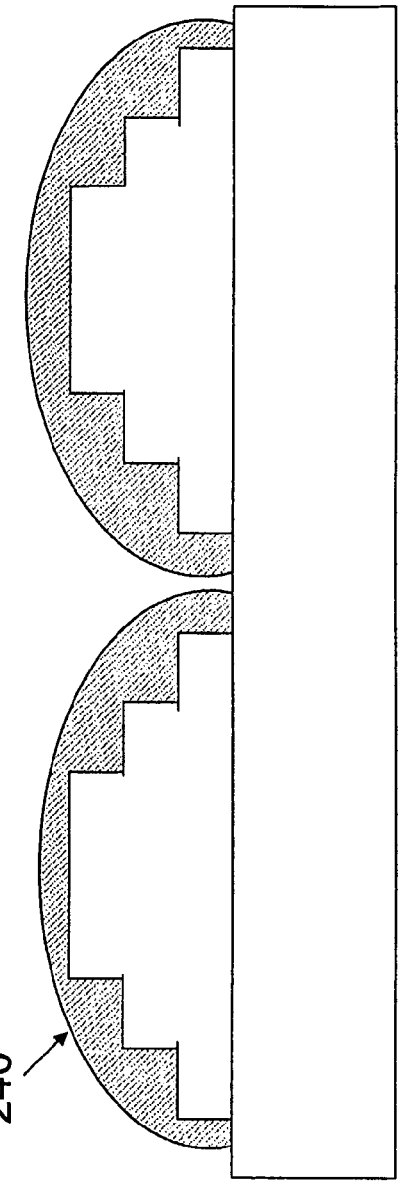
FIG. 7
FIG. 8

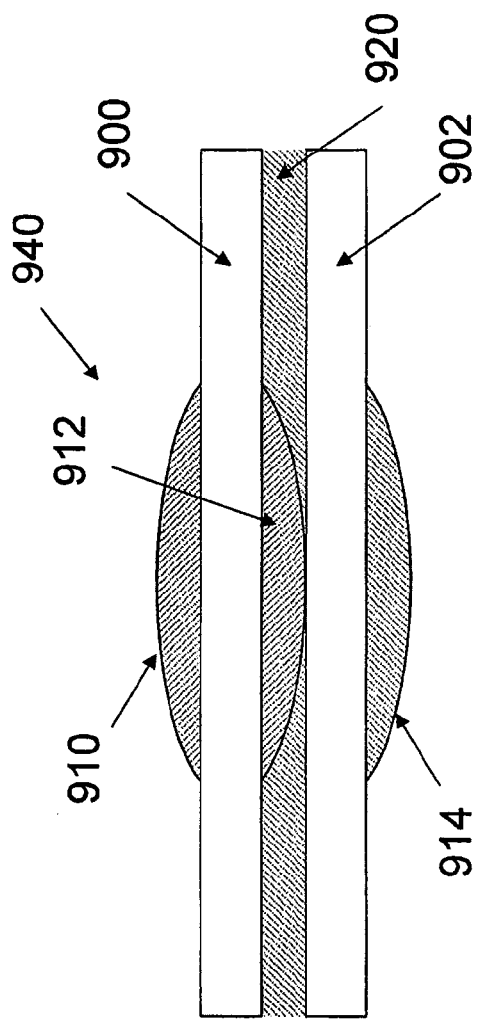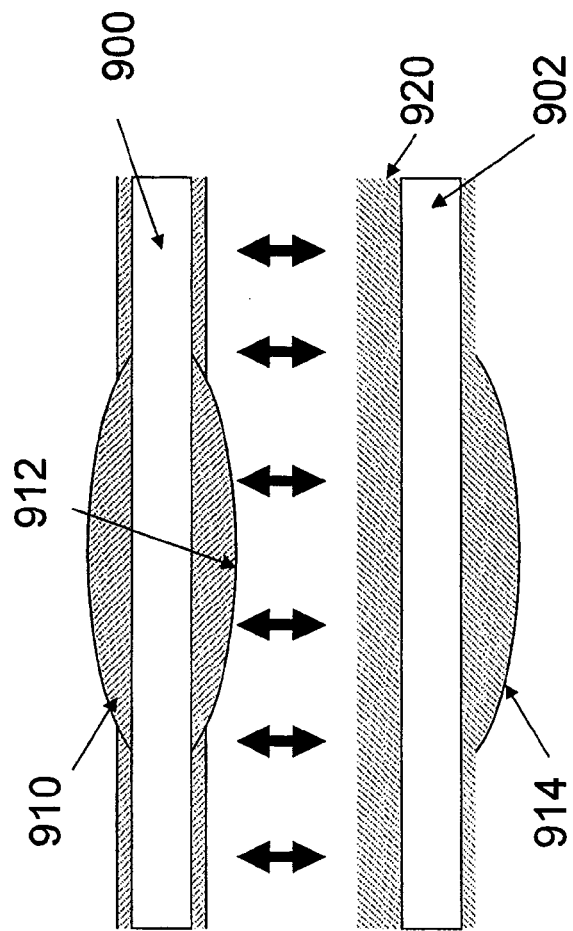

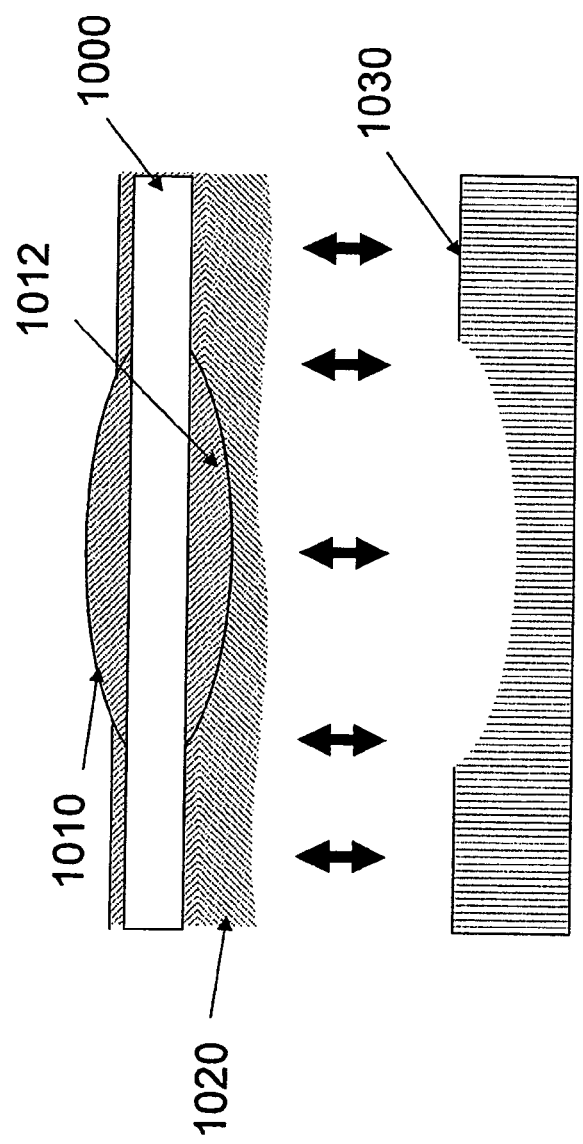
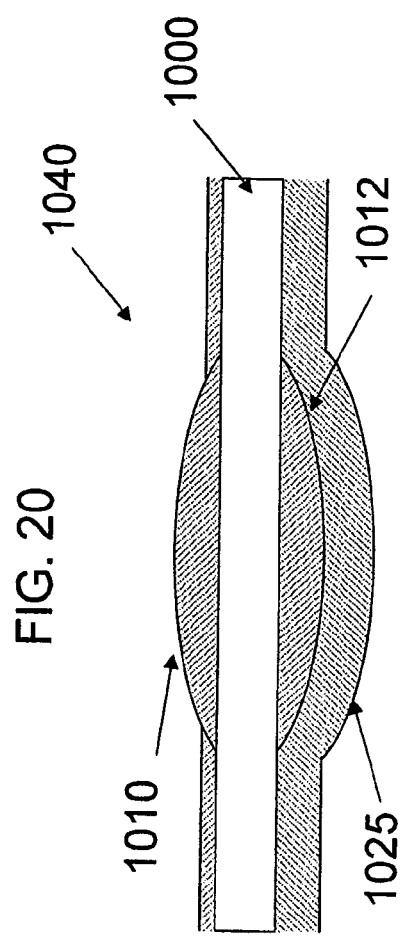
FIG. 20
FIG. 21

OPTICAL DEVICE INCLUDING AT LEAST ONE REPLICATED SURFACE AND ASSOCIATED METHODS

CROSS-REFERENCE TO RELATED APPLICATION

This application claims priority to U.S. Provisional Application No. 61/040,002, filed on Mar. 27, 2008, and entitled "Optical Device Including at Least One Replicated Surface and Associated Methods."

BACKGROUND

1. Field of the Invention

Embodiments are directed to an optical device and associated methods. More particularly, embodiments are directed to an optical device having at least one replicated surface and associated methods.

2. Description of Related Art

There are advantages and disadvantages to most types of materials used to make optical surfaces, i.e., surfaces having optical power, both in manufacturing and performance. For example, polymer materials may allow a wide variety of shapes to be accurately realized, and may provide more degrees of freedom in making wafer based optical elements. However, such materials may suffer from high temperature dependence of optical characteristics, e.g., refractive index, and mechanical characteristics, e.g., diameter. Further, when a thickness of polymer material needed to create a specific lens design increases, excessive shrinkage may occur. In contrast, while glass has a relatively low coefficient of thermal expansion (CTE) and a low optical thermal coefficient, when sags of glass lenses increases and a number of lenses to be created simultaneously increases, non-uniformity of the lenses may increase, reducing yield depending upon manufacturing techniques employed.

Therefore, there is a need to create optical elements on one substrate surface including optical surfaces that combine advantages of more than one material and/or type of material. Additionally, there is a need for lenses of different refractive indices which may allow more compact design, more design freedom, and/or better performance to be realized.

The above information disclosed in this Background section is only for enhancement of understanding of the background of the invention, and therefore it may contain information that does not form prior art.

SUMMARY OF THE INVENTION

Embodiments are therefore directed to an optical device and associated methods, which substantially overcome one or more of the problems due to the limitations and disadvantages of the related art.

It is therefore a feature of an embodiment to create an optical device and associated methods in which process variations and/or surface irregularities may be compensated.

It is therefore another feature of an embodiment to create an optical device and associated methods which exploit the best attributes of materials.

It is therefore yet another feature of an embodiment to create an optical device and associated methods which allow more complex lens designs to be realized.

It is therefore still another feature of an embodiment to create an optical device and associated methods which allow numerous surfaces to be realized without increasing a number of substrates.

It is therefore another feature of an embodiment to create an optical device and associated methods in which multiple surface structures are be self-aligned.

At least one of the above and other features and advantages may be realized by providing an optical device, including a substrate, a non-planar transparent structure on a first surface of the substrate, the non-planar transparent structure being made of a first material, and a molded refractive surface on the first surface of the substrate adjacent the non-planar transparent structure, the molded refractive surface being made of a second material, different from the first material.

The molded refractive surface may be on a central region and/or a peripheral region of the non-planar transparent structure. The molded refractive surface is directly on the first surface of the substrate. The first and second materials may have substantially equal indices of refraction or may have an index contrast and/or an Abbe number contrast. The first material may have a lower refractive index than the substrate or the second material. The substrate may be made of the first material. The molded refractive surface may include a polymer. The first material may include a first polymer and the second material may include a second polymer. The non-planar transparent structure may include steps, a refractive optical element, a convex optical element, a concave optical element, etc. Another non-planar transparent structure may be stacked on the molded refractive surface and another molded refractive surface stacked on the another non-planar transparent structure. The molded refractive surface may extend an effective diameter of the non-planar transparent structure. The non-planar transparent structure may be a spherical lens and the optical device is an asphere. At least one of the non-planar transparent structure and the molded refractive surface may be made on the wafer level. The first material may be glass and the second material may include a polymer. A plurality of optical devices may be formed on a wafer.

At least one of the above and other features and advantages may be realized by providing a method of manufacturing a plurality of optical devices, the method including providing a plurality of non-planar transparent structures on a first surface of a substrate, the base structures being made of a first material, and providing a plurality of molded refractive surfaces adjacent corresponding ones of the plurality of non-planar transparent structures on the first surface of substrate, the molded refractive surfaces being of a second material, different from the first material, each optical device including at least one non-planar transparent structure and at least one molded refractive surface.

Providing the plurality of molded refractive surfaces may include characterizing deviations in the plurality of non-planar transparent structures, creating a master in accordance with the deviations, and applying the master to a moldable material between the master and the substrate. The non-planar transparent structures may have an optical parameter less than a predetermined optical parameter. Providing the plurality of molded refractive surfaces may include creating a master in accordance with the predetermined optical parameter, and applying the master to a moldable material between the master and the substrate. The optical parameter may be sag, diameter, an optical prescription, and so forth.

At least one of the above and other features and advantages may be realized by providing a camera including a first substrate of a substrate material having a refractive index of about 1.526 and an Abbe number of about 62.8, a first aspheric surface of a first material on a first surface of the first substrate, the first material having a refractive index of about 1.519 and an Abbe number of about 50.9, a second aspheric surface of the first material on a second surface of the first substrate, a third aspheric surface of a second material on the second aspheric surface, the second material having a refractive index of about 1.582 and an Abbe number of about 33, a second substrate of the substrate material, a fourth aspheric surface of the second material on a first surface of the second substrate, a fifth aspheric surface of the second material on a second surface of the second substrate, a sixth aspheric surface of the first material on the fifth aspheric surface, a third substrate of the substrate material, a seventh aspheric surface of the second material on a first surface of the third substrate, an eighth aspheric surface of the first material on a second surface of the third substrate, a ninth aspheric surface of the second material on the eighth aspheric surface, and a sensor.

BRIEF DESCRIPTION OF THE DRAWINGS

The above and other features and advantages will become more apparent to those of ordinary skill in the art by describing in detail exemplary embodiments thereof with reference to the attached drawings, in which:

FIGS. 1 to 4 illustrate cross-sectional views of stages in a method of manufacturing an optical structure in accordance with an embodiment;

FIGS. 5 to 8 illustrate cross-sectional views of stages in a method of manufacturing an optical structure in accordance with an embodiment;

FIG. 17 illustrates a cross-sectional view of an optical structure in accordance with an embodiment;

FIG. 18 illustrates a cross-sectional view of a stage in a method of manufacturing the optical structure of FIG. 17 in accordance with an embodiment;

FIGS. 20 to 21 illustrate cross-sectional views of stages in a method of manufacturing an optical structure in accordance with an embodiment;

DETAILED DESCRIPTION OF THE INVENTION

Figure 3:
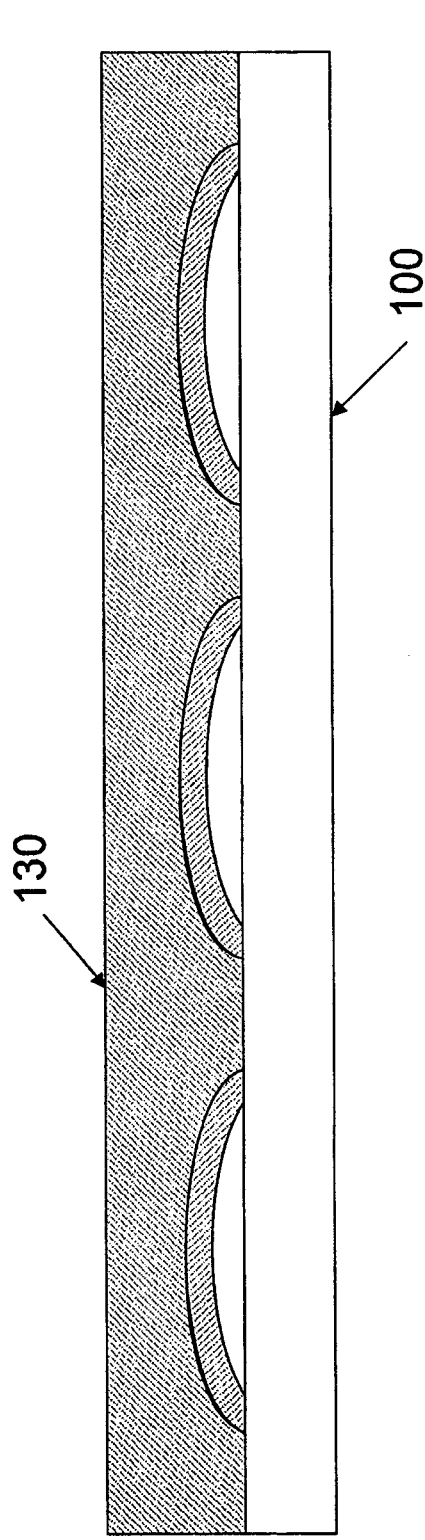

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. As used herein, the term "wafer" should be understood as meaning any substrate on which a plurality of components are formed in a horizontal direction which are to be horizontally separated by singulation in a vertical direction prior to final use. Like reference numerals may refer to like elements throughout.

First, uses of different materials having similar refractive indices will be discussed. Using such materials may allow process variations to be compensated, exploiting the best attributes of both materials, allow more complex lens designs to be realized, and so forth.

As illustrated in FIG. 1, a substrate 100 may include a plurality of base structures 110 thereon. The substrate 100 may be a transparent material having a low CTE and thermooptical coefficient, e.g., glass. The base structures 110 may be in the substrate 100 and may be formed from the material of the substrate 100. The base structures 110 may be produced from any suitable process, e.g., etching the substrate 100 using lithographically patterned resist, replication followed by etching, molding, ion implantation, machining, and so forth.

Figure 4:
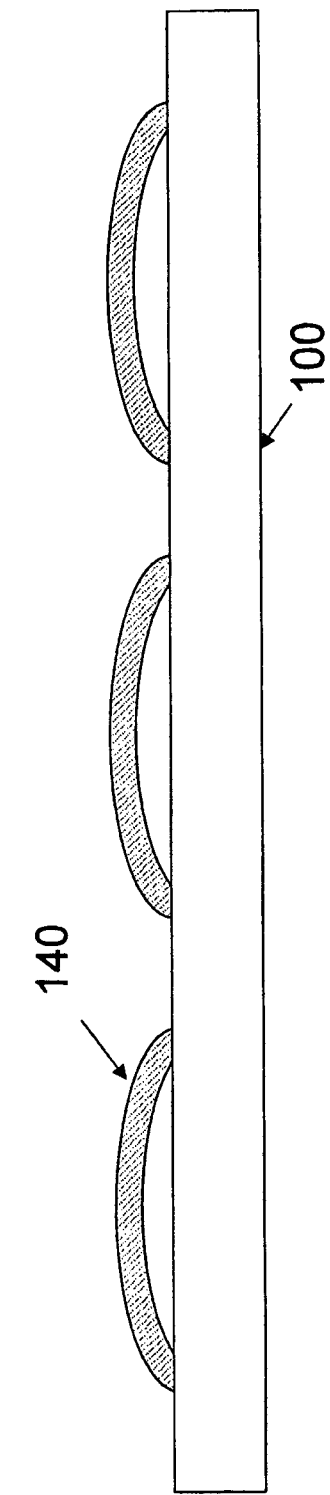

As illustrated in FIG. 2, a polymer material 120 may be provided on the base structures 110. Then, a master 130 may be brought into contact with the polymer material 120, as illustrated in FIG. 3. The polymer material 120 may then be cured and the master 130 removed, resulting in a final lens structure 140, as illustrated in FIG. 4. The substrate 100 may then be separated along the z-axis to form a desired array or individual final lens structures 140.

While the base structures 110 are indicated as being in the substrate 100, multiple replication processes may also be used, i.e., using replication, e.g., hot embossing, to form the base structures 110. Thus, different materials for a subsequent replication step(s) may be selected, enabling better performance and thermal stability. Further, while the polymer material 120 is illustrated as only being on the individual base structures 110, the polymer material 120 could be provided on the entire substrate 100 or may be provided on the master 130.

In accordance with an embodiment, the overmolding method described in connection with FIGS. 1 to 4 may be used to correct for non-uniformities across an array of base structures 110. This may be especially useful for base structures 110 having a high sag and/or over a large diameter wafer. When the polymer material 120 is to compensate for variations in the manufacturing process used to make the base structures 110, the base structures 110 may be characterized in terms of uniformity of optical performance, e.g., radius of curvature (ROC), conic, etc., to determine systematic variation resulting from the manufacturing process. Then, such systematic variation may be compensated in designing a master or mold 130. Thus, a high yield, uniform lens array may be formed using the individually compensated master 130 to replicate the polymer material 120. Suitable replication techniques include ultra-violet (UV) embossing, hot embossing, nano imprinting, etc. Further, in addition to polymer materials 120, other materials such as thermoplastics, thermosets, sol-gels, and the like may be used in the replication process. The curing process may be achieved in different manners, including for example through UV exposure, or anaerobic, chemical, or heat processes.

Additionally, substrates to be used may be polished, e.g., have a surface finish of about 1 nm or rough cut, e.g., have a surface finish of about 100 nanometers for rough cut. Irregularities in the surface finish of substrates which appears in the base structures formed therein may be compensated by providing a polymer material having a similar refractive index. Thus, costly polishing stages, e.g., fire polishing, mechanical polishing, or acid polishing may be omitted. This may be particularly advantageous as sizes of wafer to be processed increase.

In accordance with another embodiment, use of more than one material may improve thermal performance as compared to a replicated polymer lens and may mitigate physical shrinkage of the polymer material during replication. The polymer material may be replicated to realize final optical devices 140 having a predetermined optical specification. For example, the base structures 110 may have a sag less than a predetermined sag and the master 130 may be designed to provide the predetermined sag. Then, the polymer material 120 may be applied to the substrate 100 and the master 130 may be applied. Thus, the final optical devices 140 may have the predetermined sag. Thus, the base structures 110 may be more readily and cheaply manufactured than base lenses having the predetermined optical specifications.

If the index of refraction of the polymer material is the same as that of the glass material, then the profile of the glass wafer after etching does not affect the performance of the lens. That is, the performance is determined solely by the profile described by the polymer air interface and the distance from that interface to the planar surface on the opposite side of the wafer. However, since in reality the index of refraction of the polymer won't exactly match the glass, the profile of the glass will affect the performance somewhat, but may be minimized in the design. An anti-reflective coating may be used to reduce the effect of the index contrast. Since a relatively thin layer of polymer material 120 may be employed, shrinkage is less of an issue. Finally, the final optical devices 140 may have a low temperature dependence due to the low CTE and dn/dt of the base structures 110, and may be very precisely formed due to replication in the polymer material 120.

As an alternative to the continuous surface of the base structures 110, which form a refractive surface as illustrated in FIGS. 1 to 4, a base structures 210 on a substrate 200 may include discrete steps, as illustrated in FIG. 5. Formation of stepped base structures 210 may be faster and more accurate than forming a continuous base structures using analog etching techniques.

As illustrated in FIG. 6, the substrate 200 having the base structures 210 may be coated with a polymer material 220. As illustrated in FIG. 7, a master 230 may be applied to the polymer material 220 on the substrate 200. The replicated polymer material 220 may be cured, e.g., with UV light. FIG. 8 illustrates the final optical device 240 after the master 230 has been removed.

Figure 9:
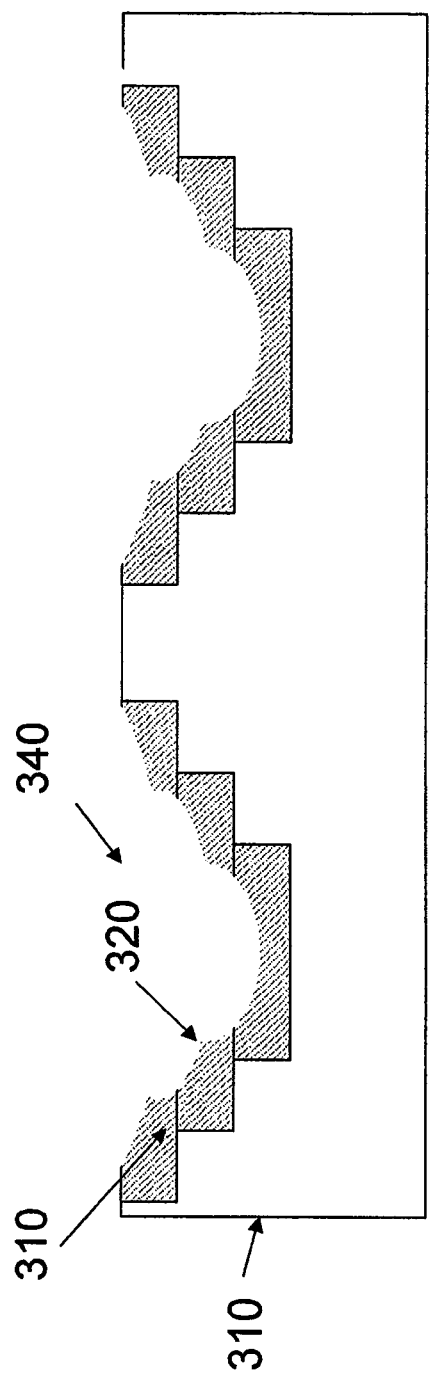
FIG. 9 illustrates a cross-sectional view of an optical structure in accordance with an embodiment.

FIG. 9 illustrates the same process, but for a concave surface. In particular, a concave stepped base structure 310 may be formed in a substrate 300. Then, a polymer material 320 may be provided in the concave stepped base structure 310, which may then be replicated and cured to form a final optical device 340.

As shown in FIGS. 8 and 9, when using a discrete level base structure, step heights may be designed such that a master will come in contact with the corners or close to the corner of etch step. In this case, the maximum thickness of the polymer material 220, 320 may be substantially equal to the maximum step height chosen (or slightly larger than this amount).

Figure 10:
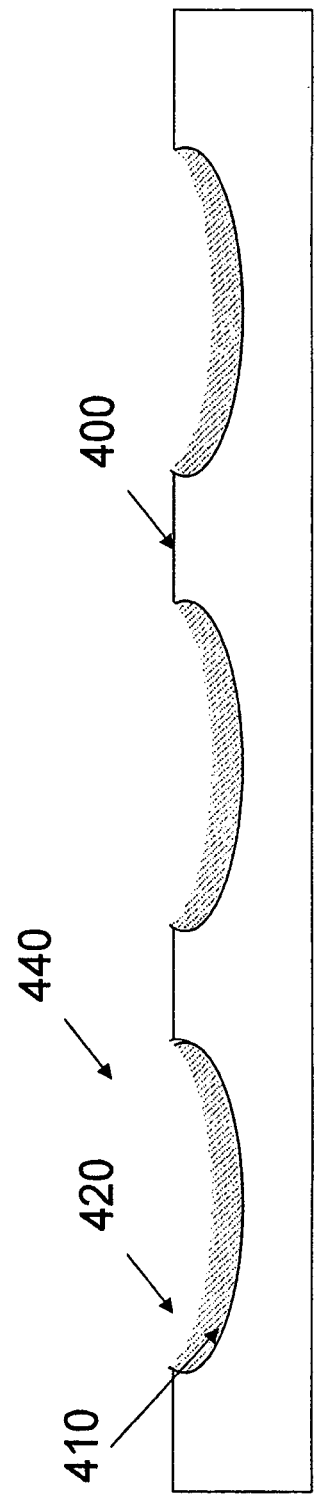
FIG. 10 illustrates a cross-sectional view of an optical structure in accordance with an embodiment.

FIG. 10 illustrates a concave continuous base structure 410 formed, e.g., by wet etching, and then overmolded with a polymer material 420, which then may be replicated to form a final optical device 440. Wet etching may be performed more cheaply than dry etching.

Figure 11:
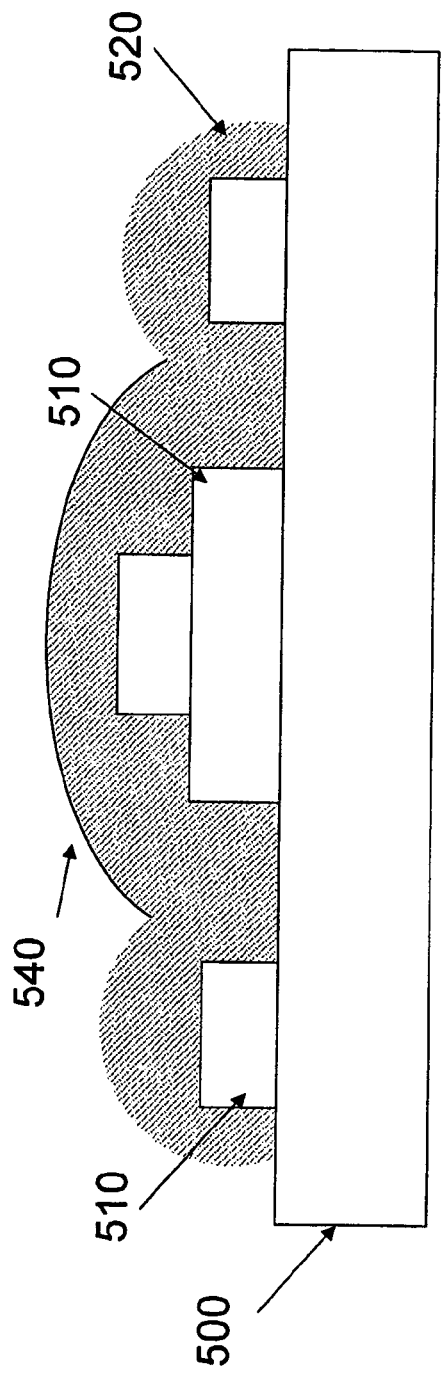
FIG. 11 illustrates a cross-sectional view of an optical structure in accordance with an embodiment.

FIG. 11 illustrates the cross section of a single final optical device 540 having a stepped base structure 510 on a substrate 500, which then has a polymer material 520 replicated thereon. The final optical device 540 illustrated in FIG. 11 is an example of a "gull wing" lens, i.e., has both positive and negative curvatures across the lens surface.

Figure 12:
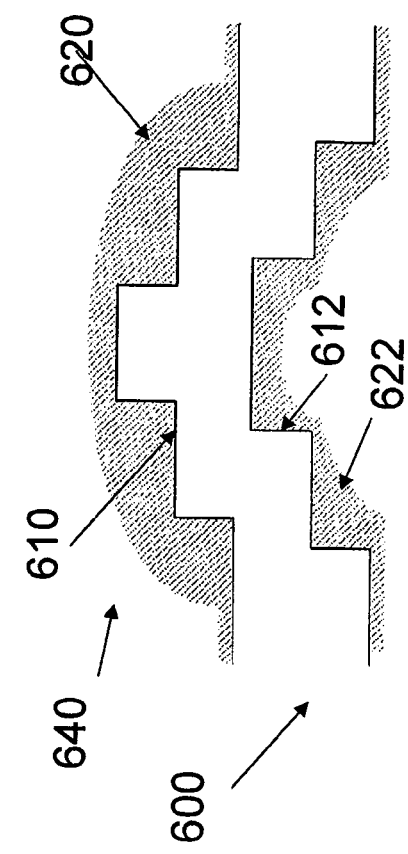
FIG. 12 illustrates a cross-sectional view of an optical structure in accordance with an embodiment.

FIG. 12 illustrates providing stepped base structures 610, 612 on opposite surfaces of a substrate 600, applying polymer material 620, 622 to the respective base structures 610, 612, and replicating the polymer material 620, 622 to form a final optical device 640. As illustrated in FIG. 12, the final optical device 640 may be a convex-concave or meniscus lens.

Figure 13:
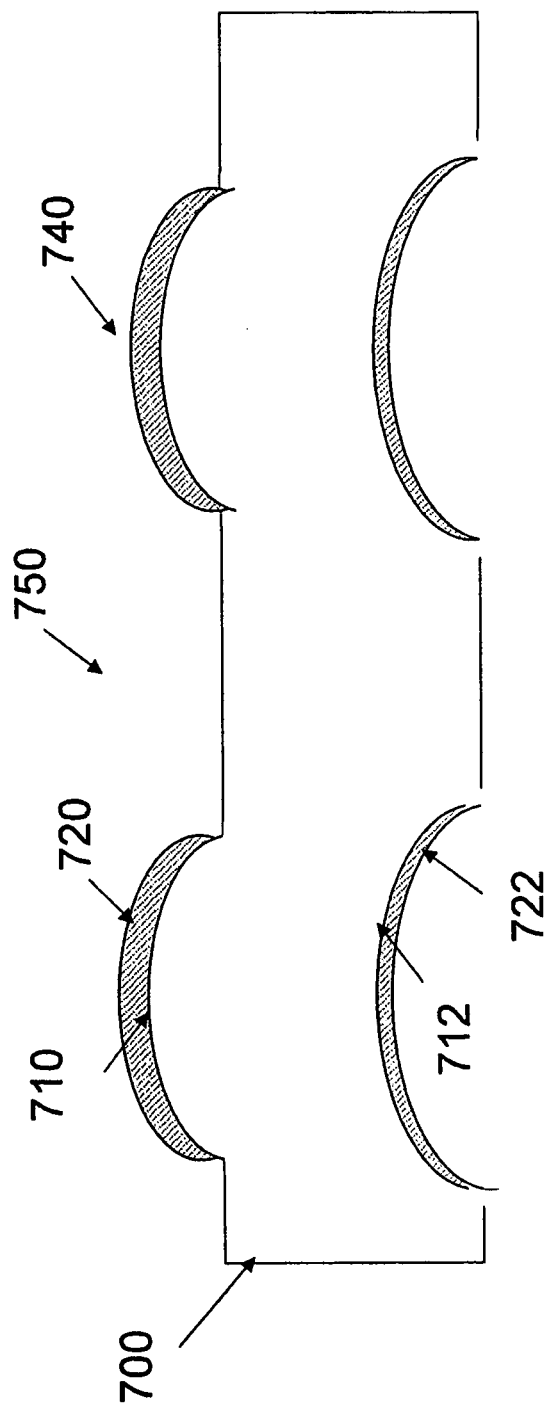
FIG. 13 illustrates a cross-sectional view of an optical structure in accordance with an embodiment.

FIG. 13 illustrates an approach similar to that shown in FIG. 12, but in which continuous base structures 710, 712, instead of stepped structures, are provided on either side of a substrate 700. The continuous base structures 710, 712 may be formed by dry etching. As in FIG. 12, the final optical devices 740 may form meniscus lenses.

In some embodiments, the base structures discussed above have been generally characterized as base lenses (e.g., continuous spherical or aspherical surfaces). However, when substantially matching the index of refraction between the base structure and the polymer, and overmolding all of the base structure, this base structure may be any suitable non-planar transparent structure, i.e., have any desired shape for realizing particular optical performance once over molded. For example, the non-planar transparent structure may be a pyramid, cylinder, cone, toroid, or any arbitrary shape, etc.

While molding polymer over an existing base structure as described above may be useful for numerous applications, making a large enough base structure for other applications may be difficult. Further, there is no current practical wafer level manufacturing of general aspheres. Typically, for an etched glass lens, the lens prescription and diameter are limited by the photoresist reflow technology, so general aspheres are not possible, and only a small range of ROC and K prescriptions are available for a given diameter of lens. For an all polymer lens, the dispersion and expansion properties of the polymer are problematic for applications that require a larger operational temperature range. Additionally, as noted above, thicker polymer layers are more difficult to manufacture, so large sag lenses may not be possible.

Figure 14:
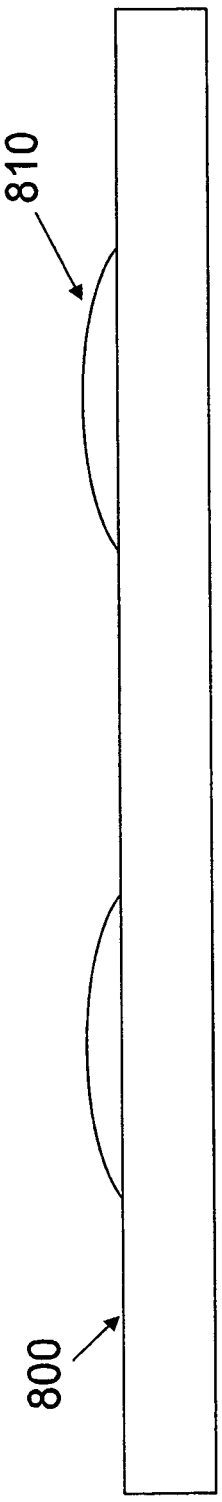
FIGS. 14 to 16 illustrate cross-sectional views of stages in a method of manufacturing an optical structure in accordance with an embodiment.
Figure 15:
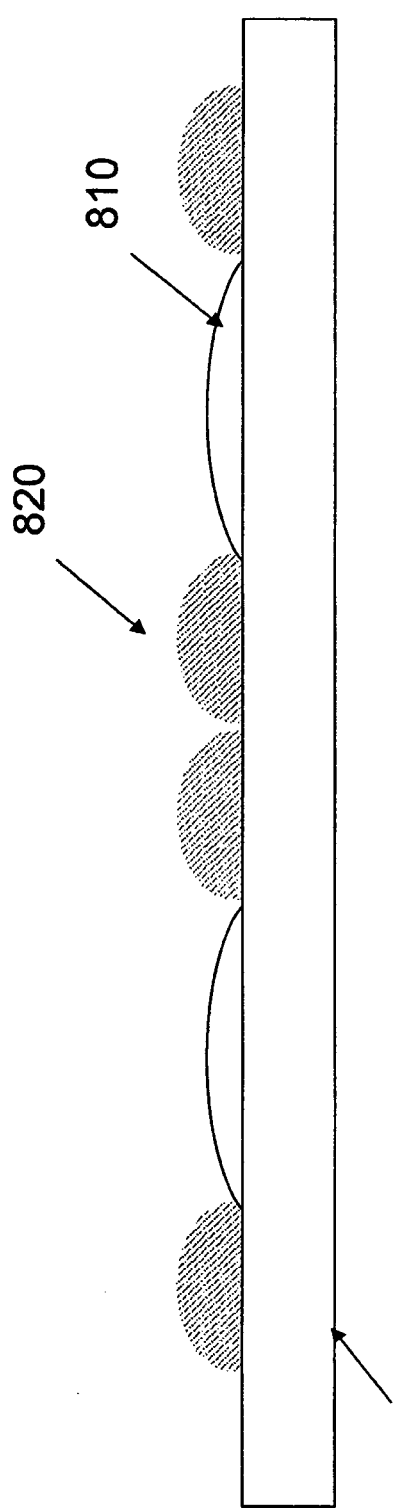
Figure 16:
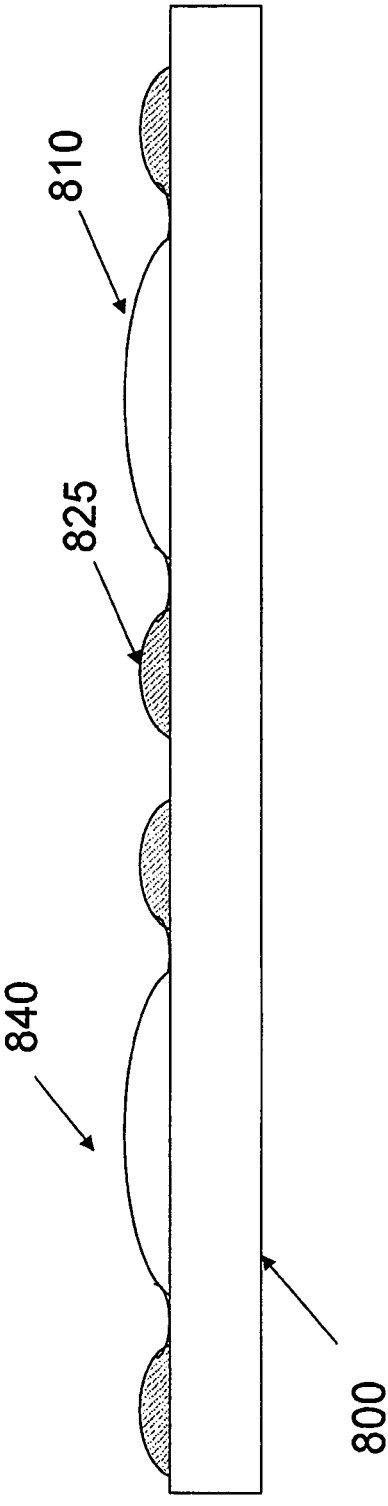

FIGS. 14 to 16 illustrate cross-sectional views of stages in a method of manufacturing an optical device in accordance with an embodiment. As discussed in detail below, rather than providing a polymer on a central portion of a base lens, as discussed above, a polymer material may be provided at a periphery of the base lens, either actually on edges of the base lens or adjacent thereto. For example, the polymer material may be replicated around the edges of the base lens to increase a diameter and/or provide aspheric correction to the edges of the base lens.

Such designs may provide better thermal performance than an all polymer solution, especially with respect to on-axis performance, since the center is all glass. Such designs may also reduce stress placed on the polymer, since less polymer may be used to make up the bulk of the lens. Thus, larger lenses and/or general aspheres may be realized with the bulk of the material being made of glass, i.e., the base lens. Further, the requirements for etched lens performance may be lowered, since correction may be provided by the molded component. Additionally, lens performance may be less sensitive to wafer manufacturing defects outside central portion of the base lens, since, according to embodiments, polymer will fill these regions during molding process. The provision of polymer in the periphery of bases lenses may be employed for both positive and negative base lenses.

As illustrated in FIG. 14, a substrate 800 may include base lenses 810 thereon. The base lenses 810 and the substrate 800 may be the same material, e.g., glass. Then, as illustrated in FIG. 15, polymer material 820 may be provided at peripheries of the base lenses 810. Then a master (not shown) may be used to mold the polymer material 820, which may then be cured to form aspheric optical devices 840, including the base lenses 810 in the center and surrounded by the replicated portions 825. The materials used in connection with the embodiments illustrated in FIGS. 14 to 16 may have different or the same refractive indices.

Now, uses of materials having different optical properties, such as different refractive indices and/or different Abbe numbers, will be discussed. Using such materials may allow numerous surfaces to be realized without increasing a number of substrates. Further, multiple surface structures may be self-aligned. Additionally, a polychromatic modulation transfer function (MTF) may be improved using materials having bigger index differences and/or different dispersions, i.e., Abbe numbers.

As illustrated in FIG. 17, a final optical device 940 may be a bonded multi-substrate optical lens component, and may include lens elements 910, 912 on a first substrate 900, a lens element 914 on a second substrate 902, and polymer material 920 between the first and second substrates 900, 902. The polymer material 920 includes a refractive index sufficiently different from that of the lens 912 so that optical performance may be realized. Further, the polymer material 920 may be molded by the lens 912. Thus, at least these two secured surfaces, i.e., surfaces of 920 and 912, are inherently self-aligned to each other through molding and surface contact. Optionally, two substrates 900, 902 may be bonded together in whole or in part by the cemented lenses on the surfaces facing each other. As illustrated in FIG. 17, the material of the lens 914 may be the same as that of the polymer material 920, but embodiments are not limited thereto.

As illustrated in FIG. 17, materials having different refractive indices may be used to realize a wafer level optics structure with multiple lens surfaces where two or more of the lens surfaces are bonded, i.e., in contact across the lens surface, and at least one of the bonded surfaces is a polymer or moldable material which adheres to the other surface(s) without the need for a separate securing material, e.g, a separate glue or epoxy. The bonded multi-substrate optical design may be used to correct chromatic aberrations in the imaging system and provides self-alignment, self-molding, and self-adhering of the two bonded surfaces.

Previous multi-substrate solutions made on a wafer level typically included air-spaced substrates. However, in accordance with embodiments, multiple lens surfaces of differing materials with no air gap or minimal air gap may be realized, where at least one of the lens surfaces is fabricated on the wafer level as the substrates are brought into contact with one another. The resulting structure is a self-bonded, self-molded, and self-aligned lens component fabricated on the wafer level. As used herein, a lens "component" is intended to mean a grouped plurality of transparent masses arranged in series along the optical axis of the lens with their adjacent refracting surfaces either in full overall contact or in spaced parallel relation with the spacing being of such small magnitude that the spacing does not enter into the lens computations, the two axially extreme refracting surfaces of the plurality of masses having at least a portion thereof axially air-spaced from all other adjacent refracting surfaces that may be present in the lens.

Figure 19:
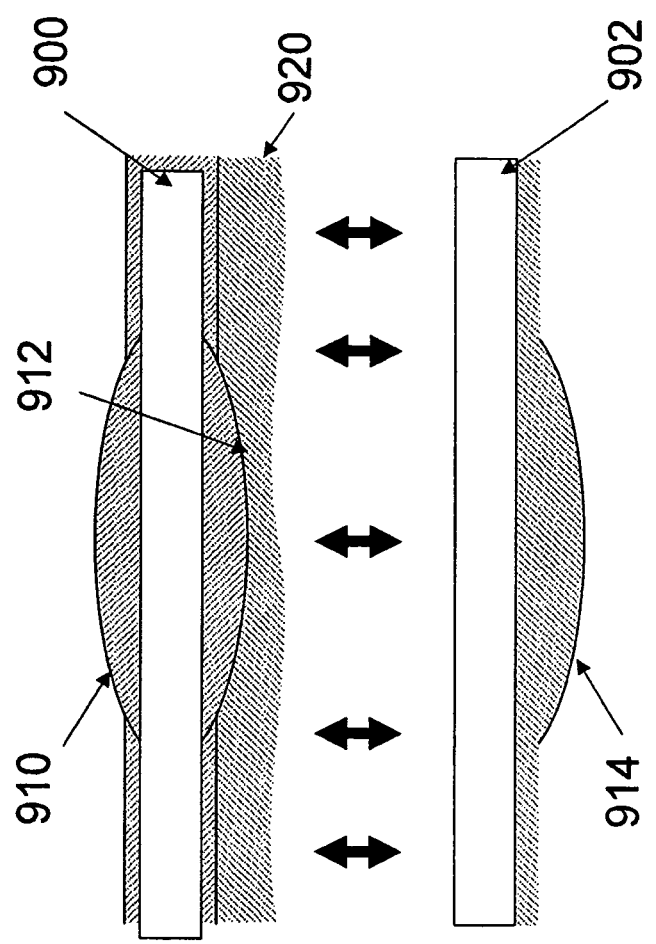
FIG. 19 illustrates a cross-sectional view of a stage in a method of manufacturing the optical structure of FIG. 17 in accordance with an embodiment.

FIGS. 18 and 19 each illustrate a cross-sectional view of a stage in alternative methods of making the optical device 940 according to embodiments. In each of FIGS. 17-21, a single optical device 940 is shown, thought it should be understood that an array of optical devices 940 may be fabricated using the described techniques. As illustrated in FIG. 18, the lens 912 of a first material, e.g., a polymer or a non-polymer, may be provided on the first substrate 900. The polymer material 920 may be provided on the second substrate 902. Then, the first and second substrates 900, 902 may be brought into contact such that the lens 912 contacts the polymer material 920, thus molding and self-aligning the polymer material 920 to the inverse shape of the lens 912. The polymer material 920 may be cured, thereby bonding the polymer material 920 to the lens 912, the first substrate 900, and the second substrate 902.

As illustrated in FIG. 19, the lens 912 of the first material, polymer or non-polymer, may be created or deposited on a wafer level on the first substrate 900. The polymer material 920 may be applied on top of the lens 912 on the first substrate 900. Then, the second substrate 902 may be brought into contact with the polymer material 920. The polymer material 920 may then be cured, thus bonding the wafer-level lens 912, the first substrate 900 and the second substrate 902 in a self-aligned and self-bonded lens component.

FIGS. 20 and 21 illustrate cross-sectional views in stages of manufacturing a final optical device 1040, i.e., a lens component 1040, on a single substrate 1000. First, a lens 1012 of a first material may be fabricated at the wafer level on the substrate 1000. A lens 1010 may also be on an opposite surface of the substrate 1000. A polymer material 1020, having a different refractive index than the lens 1012, may be applied on top of the lens 1012 on the substrate 1000. Then, as illustrated in FIG. 20, a master 1030 may be brought into contact with the polymer material 1020, forming a lens 1025 on an outer surface of the polymer material 1020. The polymer material 1020 may be cured and the master 1030 removed, thus bonding the lens 1012 with the lens 1025 together into a self-aligned, self-bonded lens component 1040 on one substrate 1000.

Figure 22:
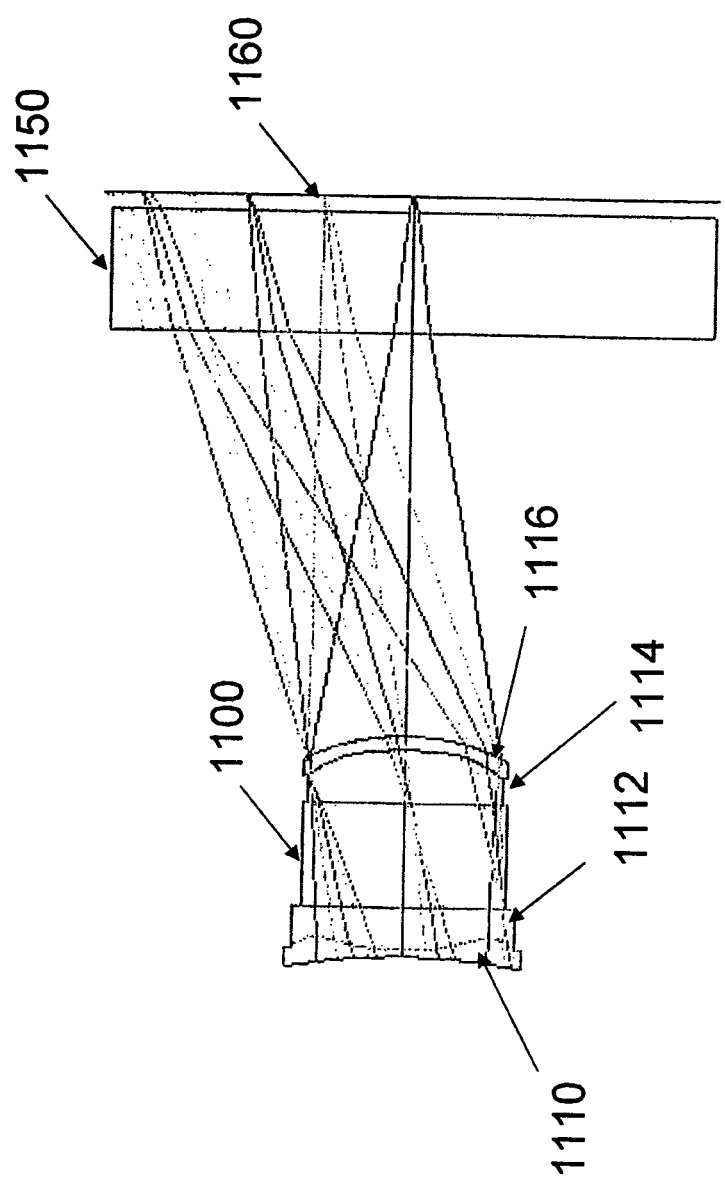
FIG. 22 illustrates a cross-sectional view of an optical structure in accordance with an embodiment.
Figure 23:
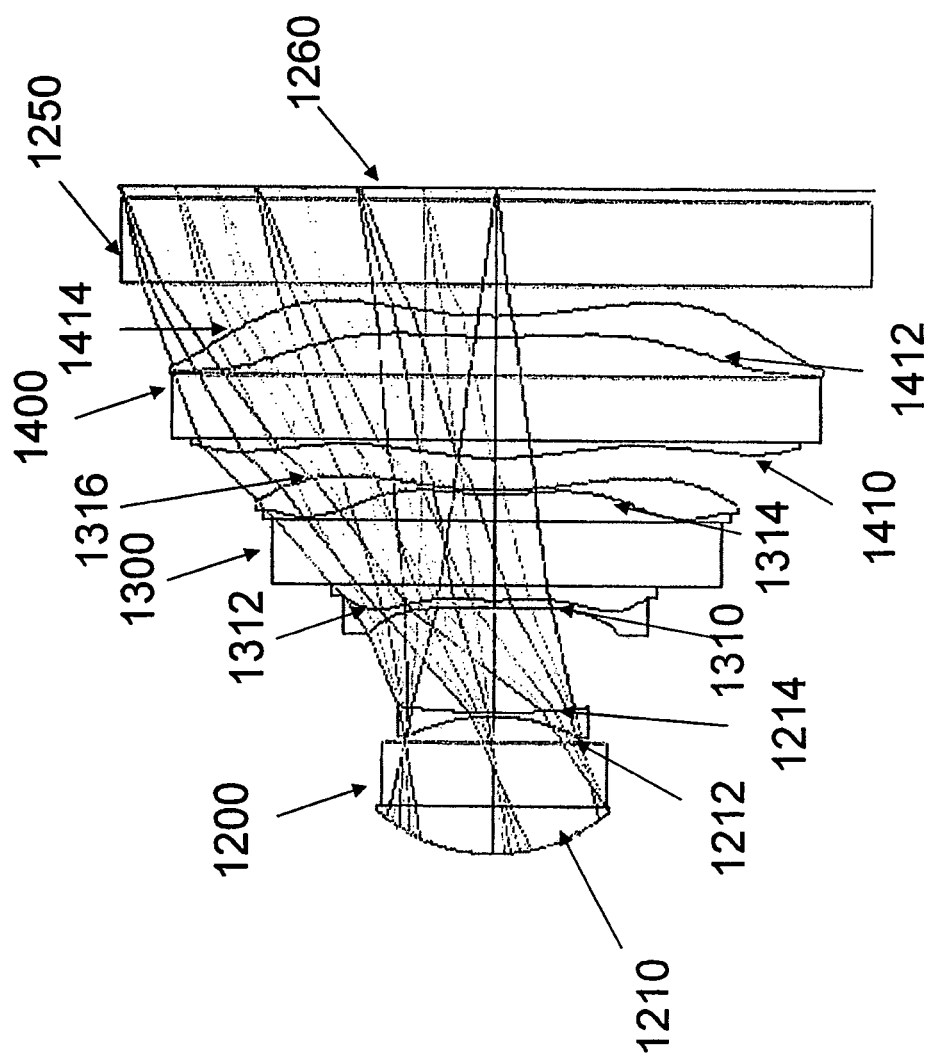
FIG. 23 illustrates a cross-sectional view of an optical structure in accordance with an embodiment.

FIGS. 22 and 23 illustrate cross-sections of a further extension of replicating or over molding surfaces of different materials directly on one another in accordance with embodiments. In FIGS. 22 and 23, an optical device including such overmolding is illustrated as part of a camera system. By molding surfaces on top of already molded or created lenses, a number of curved surfaces in the design may be increased without increasing the number of substrates.

Conventionally, to increase a number of available optical surfaces, existing designs must increase the number of substrates used in the design. For example, if two additional curved surfaces are desired to be incorporated into a two substrate, four-curved surface design, an additional substrate must be added, resulting in a six-curved surface, three-substrate design. Increasing the number of substrates increases the cost and increases the thickness of a system element that does not contribute to the optical functioning of the design, e.g., due to the thickness of the substrates themselves.

In contrast, in the particular example illustrated in FIG. 22, a substrate 1100 may include a first aspheric surface 1110 of a first material, which is on a second aspheric surface 1112 of a second material, which, in turn, is on the substrate 1100. An opposite side of the substrate 1100 may include a third aspheric surface 1114 of the first material and a fourth aspheric surface 1116 of the second material. Light from this optical device may be output through a coverplate 1150 to a sensor 1160. Alternatively, though not specifically illustrated, the substrate 1100 may form a coverplate over the sensor 1160. In this alternative approach, the substrate 1100 may include integral standoffs to space the substrate 1100 a necessary amount from the sensor 1160 for optimal focus. Alternatively, a separate spacer may be positioned between the substrate 1100 and the sensor 1160.

In the particular example illustrated in FIG. 23, the optical device may include a first substrate 1200, a second substrate 1300, and a third substrate 1400. The first substrate 1300 may include a first aspheric surface 1210 of a first material on a first surface, and, on an opposite surface, may include a second aspheric surface 1212 of the first material and a third aspheric surface 1214 of a second material. A first surface of the second substrate 1300 may include a first aspheric surface 1310 of the second material and a second aspheric surface 1312 of the second material. An opposite side of the second substrate 1300 may include a third aspheric surface 1314 in the second material and a fourth aspheric surface 1316 in the first material. The third substrate 1400 may include a first aspheric surface 1410 of the second material on a first surface, and, on an opposite surface, may include a second aspheric surface 1412 of the first material and a third aspheric surface 1416 of the second material. Thus, not every surface and not every substrate includes an overmolded element. Light from this optical device may be output to through a cover plate 1250 to a sensor 1260. Alternatively, as described above, the third substrate 1400 may form a coverplate over the sensor 1160.

As a particular example, in the systems illustrated in FIGS. 22 and 23, the first material may have a refractive index of about 1.519 and an Abbe number of about 50.9, the second material may have a refractive index of about 1.582 and an Abbe number of about 33, and each substrate may have a refractive index of about 1.526 and an Abbe number of about 62.8. Using materials having different refractive indexes and/or Abbe numbers may improve the MTF and may reduce the thickness of the system. Different designs may incorporate more than two replication materials having different optical properties. Also, different designs may arrange the replication materials in different combinations and on different substrate surfaces than those specifically illustrated in FIGS. 22 and 23.

Index/Abbe number contrast available from direct overmolding may be limited due to available appropriate materials. In accordance with embodiments, as illustrated in FIGS. 24 to 30, replicated lens surfaces with air or other low index materials on either side thereof may allow higher index contrasts to be realized. Such higher index contrast, with the air or other low index material, e.g., fluids, including liquid or gas, essentially serving as a base lens, may allow more optical elements to be provided per unit volume. Further, such higher index contrast materials may also have a low Abbe number, e.g., air has an Abbe number of about 1.00003.

Figure 24:
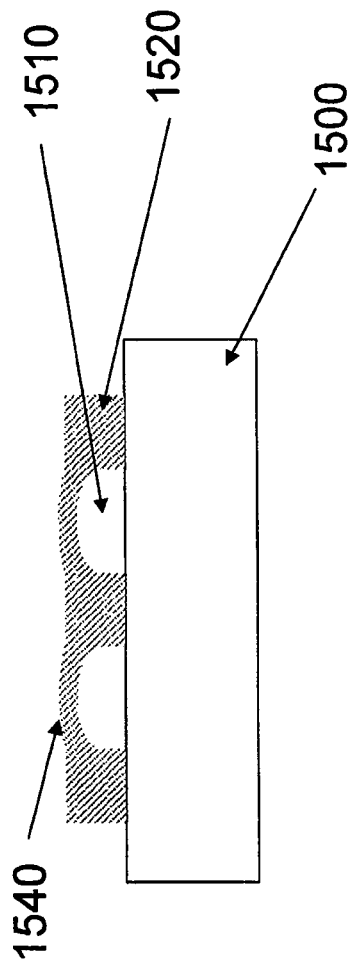
FIG. 24 illustrates a cross-sectional view of an optical structure in accordance with an embodiment.

FIG. 24 illustrates a cross-section of two final optical devices 1540 according to an embodiment. Each final optical device 1540 may include a base lens 1510 on a substrate 1500 having a polymer material 1520 thereon. In this embodiment, creation of the base lens 1510 and molding of the polymer material 1520 may be simultaneous.

Figure 25:
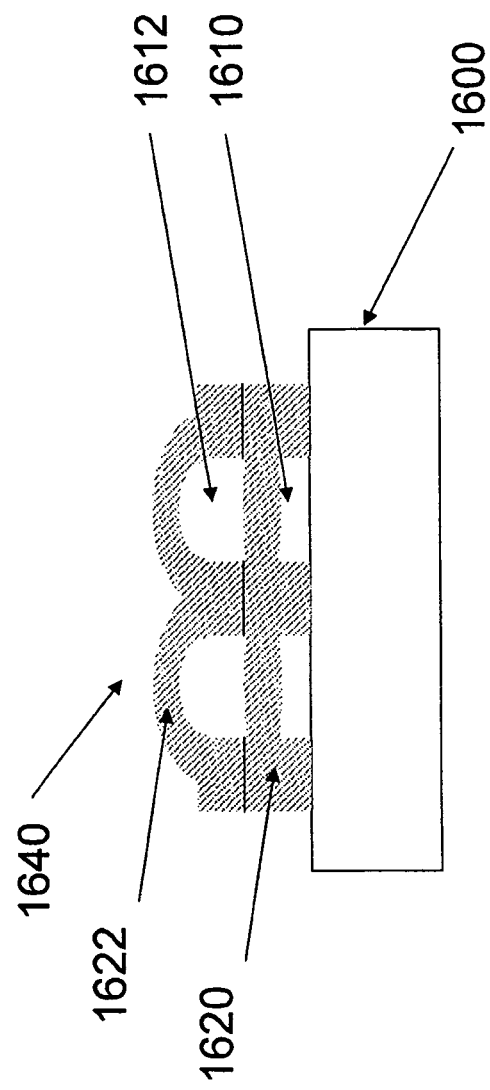
FIG. 25 illustrates a cross-sectional view of an optical structure in accordance with an embodiment.

FIG. 25 illustrates a cross-section of two final optical devices 1640 according to an embodiment. Each final optical device 1640 may include a base lens 1610 having a polymer material 1620 on a substrate 1600, and another base lens 1612 stacked on the polymer material 1620 and having another polymer material thereon.

Figure 26:
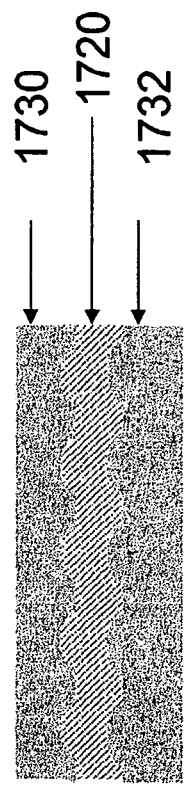
FIGS. 26 to 30 illustrate cross-sectional views of stages in a method of manufacturing an optical structure in accordance with an embodiment.

FIGS. 26 to 30 illustrate stages in a method of making a plurality of optical device 1740 according to an embodiment. As illustrated in FIG. 26, two masters 1730, 1732 may sandwich a polymer material 1720 there between. The masters 1730, 1732 may have different surface energies or release forces. Such differences may be realized by using different stamp materials or by treating one or both masters before molding, e.g. plasma exposure, adhesion inhibitor/promoter, and so forth.

Figure 27:
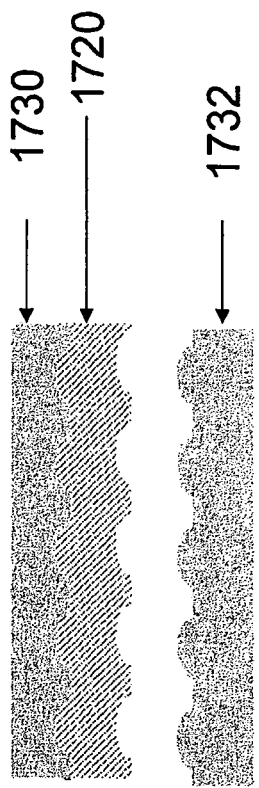
Figure 28:
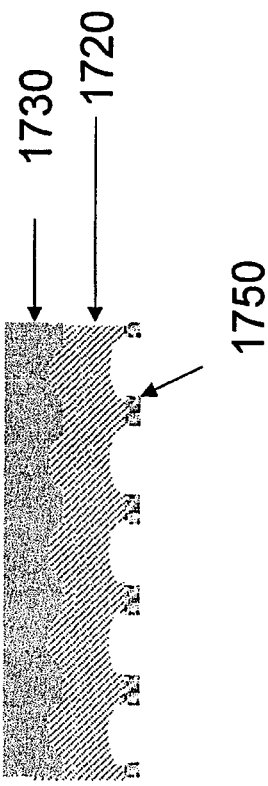

As illustrated in FIG. 27, after the polymer material 1720 has been cured, the master with lowest surface energy, here master 1732, may be removed from the polymer material 1720. As illustrated in FIG. 28, the polymer material 1720, still in contact with the other master 1730, may be provided with a securing mechanism 1750, e.g., dipping the polymer material 1720 into an adhesive or rolling, dispensing, or otherwise applying an adhesive onto a bottom surface of the polymer material 1720.

Figure 29:
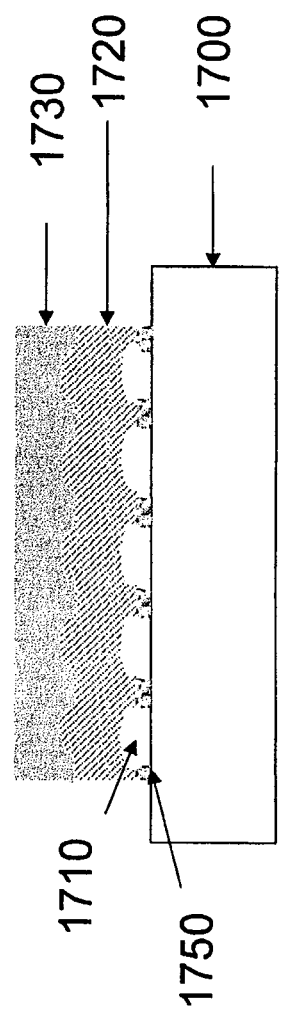
Figure 30:
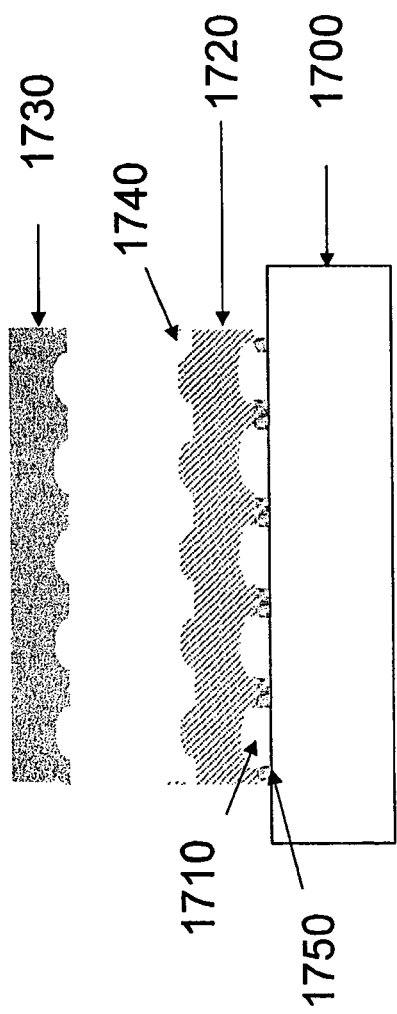

Then, as illustrated in FIG. 29, the polymer material 1720 may be secured to a substrate 1700 via the securing mechanism 1750. Finally, as illustrated in FIG. 30, the remaining master 1730 may be removed from the polymer material, forming the final optical device 1740.

As described above, overmolding base structures of a first material with a second material may provide numerous advantages. The first and second materials may be substantially matched or may have a contrast between refractive indexes and/or Abbe numbers. Resultant optical structures may be used in numerous applications, especially those having strict size constraints, e.g., cameras.

It will be understood that, although the terms "first" and "second" etc. may be used herein to describe various elements, structures, components, regions, layers and/or sections, these elements, structures, components, regions, layers and/or sections should not be limited by these terms. These terms are only used to distinguish one element, structure, component, region, layer and/or section from another element, structure, component, region, layer and/or section. Thus, a first element, structure, component, region, layer or section discussed below could be termed a second element, structure, component, region, layer or section without departing from the teachings of exemplary embodiments.

Spatially relative terms, such as "beneath," "below," "lower," "above," "upper" and the like, may be used herein for ease of description to describe one element or feature relationship to another element(s) or feature(s) as illustrated in the figures. It will be understood that the spatially relative terms are intended to encompass different orientations of the device in use or operation in addition to the orientation depicted in the figures. For example, if the device in the figures is turned over (or upside down), elements or layers described as "below" or "beneath" other elements or layers would then be oriented "above" the other elements or layers. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an nth member, where n is greater than 3, whereas the expression "at least one selected from the group consisting of A, B, and C" does not.

Exemplary embodiments are described herein with reference to cross-sectional illustrations that are schematic illustrations of idealized embodiments (and intermediate structures) of exemplary embodiments. As such, variations from the shapes of the illustrations as a result, for exemplary, of manufacturing techniques and/or tolerances, are to be expected. Thus, exemplary embodiments should not be construed as limited to the particular shapes of regions illustrated herein but are to include deviations in shapes that result, for exemplary, from manufacturing. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An optical device, comprising:
   a first substrate having opposing first and second surfaces;
   a first molded refractive lens on the first surface, the first molded refractive lens being made of a first material;
   a second substrate; and
   a second material between the first molded refractive lens and the second substrate, the second material being non-gaseous and different from the first material, first and second materials being in direct contact and the second material and the second substrate being in direct contact,
   wherein the first and second substrates are planar, the first molded refractive lens being in direct contact with each of the first and second substrates.

2. The optical device as claimed in claim 1, further comprising a second molded refractive lens on the second surface of the first substrate.

3. The optical device as claimed in claim 2, further comprising a third molded refractive lens on the second substrate, opposite the first molded refractive lens and the second material.

4. The optical device as claimed in claim 1, further comprising a second molded refractive lens on the second substrate, opposite the first molded refractive lens and the second material.

5. The optical device as claimed in claim 1, wherein the second material bonds the first and second substrates.

6. The optical device as claimed in claim 1, wherein a curved portion of the molded refractive lens is in direct contact with the second material.

7. The optical device as claimed in claim 6, wherein the second material directly contacts the first surface of the first substrate.

8. The optical device as claimed in claim 1, wherein the second material is a polymer.

9. The optical device as claimed in claim 1, wherein a portion of the first surface contacting the first molded refractive lens planar.

10. The optical device as claimed in claim 1, wherein the first molded refractive lens and first substrate are separate elements formed of different materials.

* * * * *